United States Patent [19]

Ganescu

[11] Patent Number: 5,094,059

[45] Date of Patent: Mar. 10, 1992

[54] HINGED ROOF TRUSS AND DOUBLE HINGE THEREFOR

[75] Inventor: George Ganescu, Lewisburg, Pa.

[73] Assignee: Poloron Homes of Pennsylvania, Inc., Middleburg, Pa.

[21] Appl. No.: 505,660

[22] Filed: Apr. 6, 1990

[51] Int. Cl.$^5$ .............................................. E04B 1/32
[52] U.S. Cl. ........................................ 52/641; 52/7.5; 52/645; 16/371
[58] Field of Search ............... 52/640, 641, 645, 79.5, 52/90, 93; 16/366, 371

[56] References Cited

U.S. PATENT DOCUMENTS

| | | | |
|---|---|---|---|
| 506,154 | 10/1893 | Buhrman | 16/371 |
| 1,505,593 | 8/1924 | Fryer | 16/366 |
| 1,979,039 | 10/1934 | Johnson | 52/93 |
| 2,365,579 | 12/1944 | Mulligan | 52/90 |
| 2,982,379 | 5/1961 | Fisher | 52/645 |
| 3,760,550 | 9/1973 | Mueller et al. | 52/641 |
| 3,823,522 | 7/1974 | Jureit et al. | 52/645 |
| 4,483,120 | 11/1984 | Gottlieb | 52/693 |
| 4,562,683 | 1/1986 | Gottlieb | 52/641 |
| 4,831,807 | 5/1989 | Bolt | 52/641 |

FOREIGN PATENT DOCUMENTS 354993  8/1931  United Kingdom .................. 16/371

Primary Examiner—James L. Ridgill, Jr.
Attorney, Agent, or Firm—Berman, Aisenberg & Platt

[57] ABSTRACT

A hinged building truss, such as a roof truss, includes elongated wooden structural members connected by a double hinge joint. The joint has a central elongated flat plate having first and second pivots located toward respective ends of the elongated plate. First ends of first and second flat plates overlap first and second ends of the central flat plate and rotate in the plane of the plates at the first and second pivots, respectively.

The first and second plates each include a plurality of teeth, struck from second end areas of each plate, for fastening each plate to a face of a structural member to be pivoted. The structural members can thus be rotated about the pivots. The length of the elongated plate between the overlapping portions of the first and second plates is sufficient to accommodate sheet sheathing attached to each of the structural members when the double hinged joint is in folded position with the structural members substantially parallel and adjacent to each other.

10 Claims, 3 Drawing Sheets

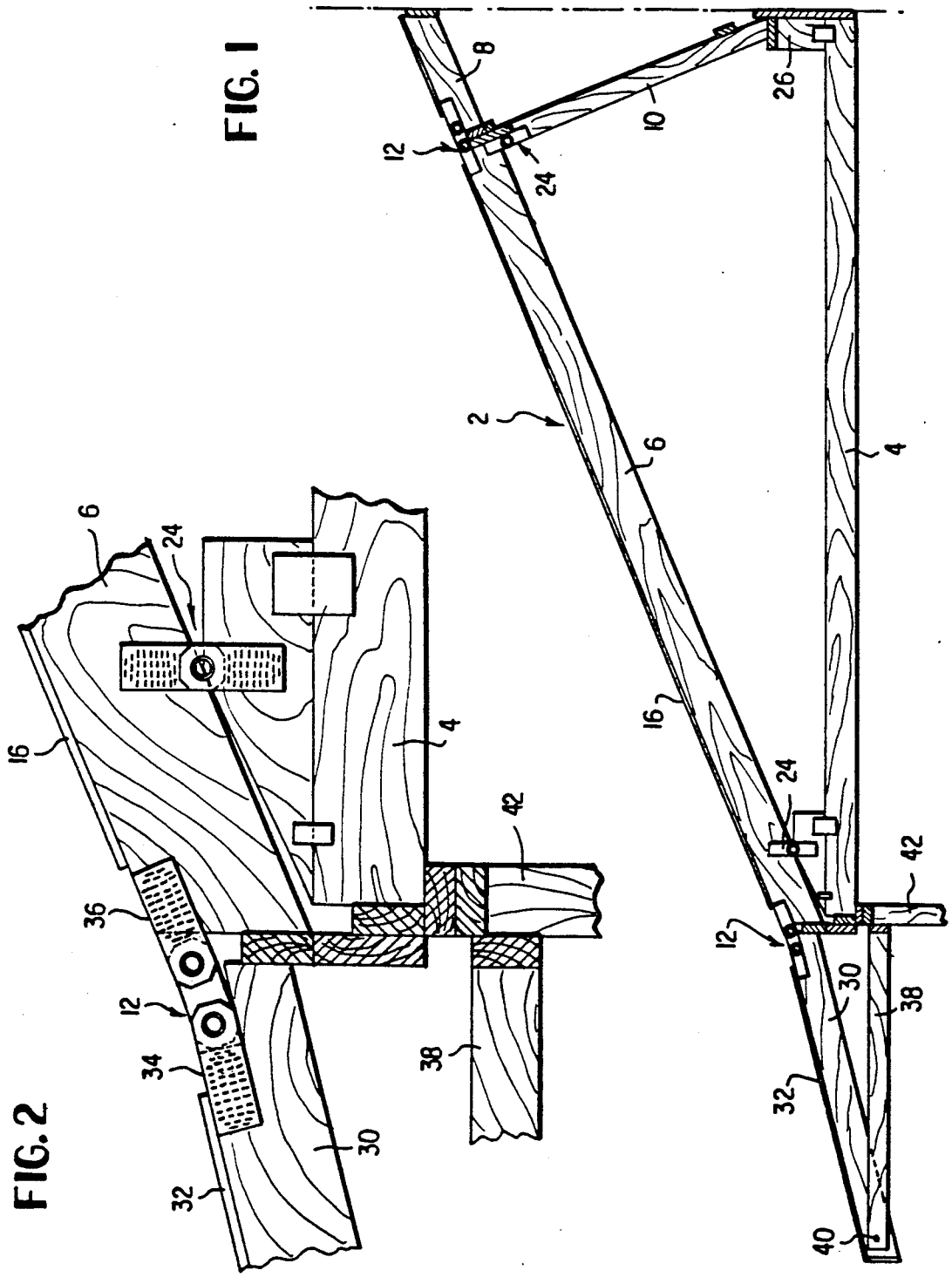

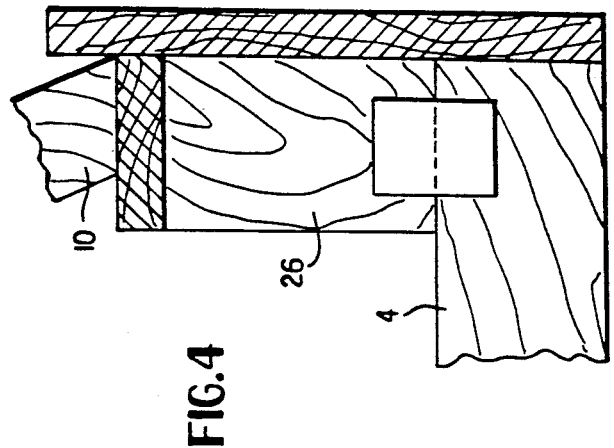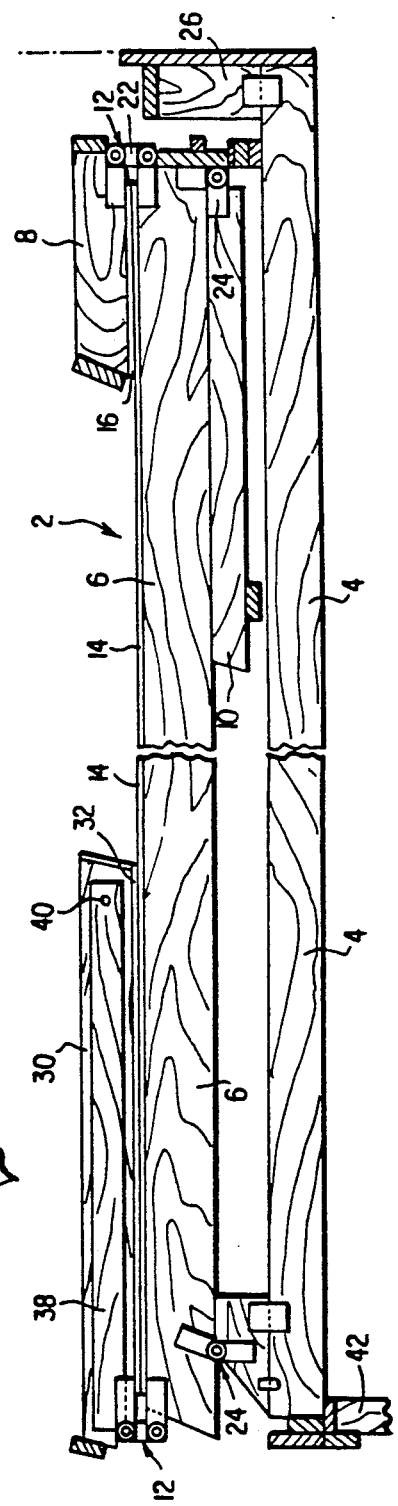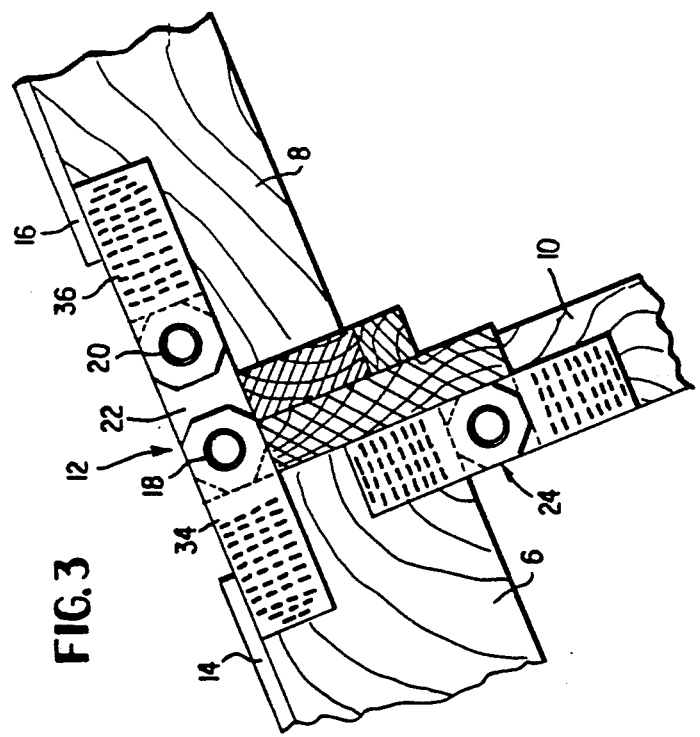

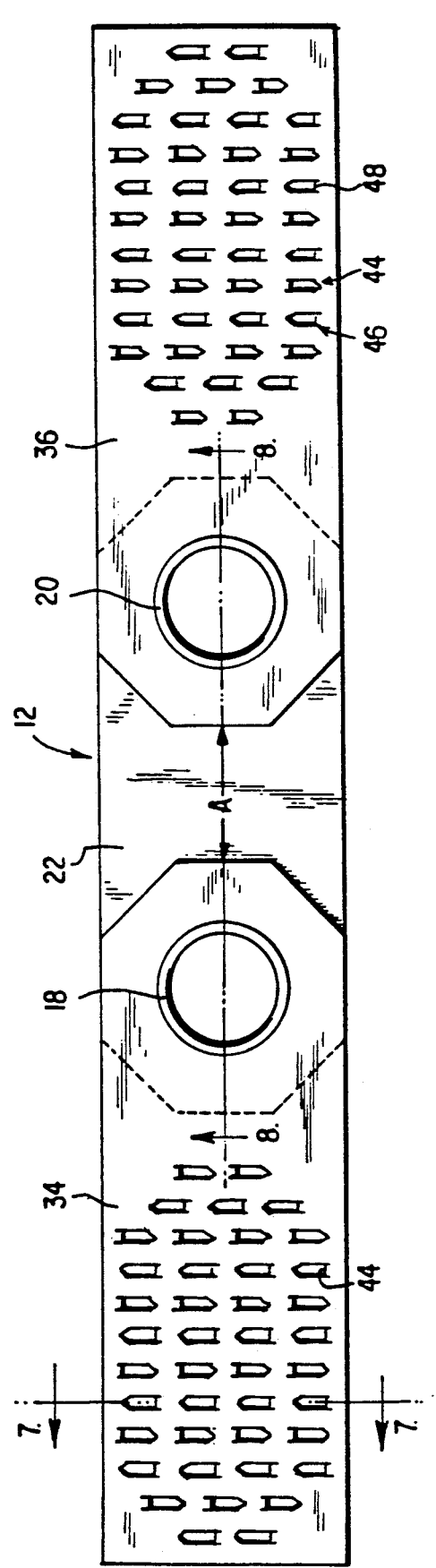
FIG. 6
FIG. 7
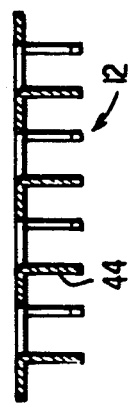
FIG. 8

HINGED ROOF TRUSS AND DOUBLE HINGE THEREFOR

FIELD OF THE INVENTION

The invention relates to a hinged roof truss for use in building construction, and a double hinge used for the truss.

BACKGROUND OF THE INVENTION

Known hinged building trusses cannot be folded compactly and are limited in the number of members which can be included in the folded truss. Bolt, U.S. Pat. No. 4,831,807, describes a profile open/folded hinged, pre-fabricated truss. The Bolt truss includes a double hinge which allows two adjacent members to be folded back on each other, but does not allow for any spacing between the members for plywood sheathing, shingles or other surface treatment. Mueller, U.S. Pat. No. 3,760,550 describes a single hinge folding truss system, including telescoping truss members. Likewise, Jureit et al., U.S. Pat. No. Re 31,234, Gottlieb, U.S. Pat. No. 4,483,120 and Gottlieb, U.S. Pat. No. 4,562,683, each show use of a single hinged truss.

SUMMARY OF THE INVENTION

A hinged building truss of the invention, such as a roof truss, includes elongated wooden structural members connected by a double hinge joint. The joint has a central elongated flat plate having first and second pivots located toward respective ends of the elongated plate. First ends of first and second flat plates overlap first and second ends of the central flat plate and rotate in the plane of the plates about the first and second pivots, respectively.

The first and second plates each include a plurality of teeth, struck from second end areas of each plate, for fastening each plate to a face of a structural member to be pivoted. The structural members can thus be rotated about the pivots. The length of the elongated plate between the overlapping portions of the first and second plates is sufficient to accommodate sheet sheathing which may be attached to each of the structural members. When the double hinged joint is in folded position with the structural members substantially parallel and adjacent to each other, the sheet sheathing is accommodated between the adjacent structural members.

It is an object of the invention to provide a folding building truss using a double hinge, for folding structural members compactly for transportation.

It is another object of the invention to provide a double hinge for folding structural members of a building truss having attached sheet sheathing.

BRIEF DESCRIPTION OF THE DRAWINGS

FIG. 1 is a side elevational view of a multiple hinged truss, using double hinges of the invention, in open position.

FIG. 2 is an enlarged side elevational view of a detail of FIG. 1.

FIG. 3 is an enlarged side elevational view of another detail of FIG. 1.

FIG. 4 is an enlarged side elevational view of a further detail of FIG. 1.

FIG. 5 is a side elevational view of the multiple hinged truss of FIG. 1, in folded position.

FIG. 6 is a top plan view of a double hinge of the invention.

FIG. 7 is a cross-sectional view taken on line 7—7 of FIG. 6.

FIG. 8 is a cross-sectional view taken on line 8—8 of FIG. 6.

DETAILED DESCRIPTION OF THE INVENTION

The present invention allows a complete building truss, such as a roof truss, which is articulated at various points, to be folded compactly for transportation using hinges of the invention. The complete truss can be folded to a height which will not exceed the limits imposed by the Department of Transportation.

The truss includes a plurality of elongated structural wood members articulated at certain points and permanently attached to other members at other points. According to the invention, support members (kneewalls) may be included as part of the truss. A truss of the invention eliminates common on site construction errors such as misplacement of kneewalls, since the kneewalls are hinged to the truss by the manufacturer prior to shipment to the site. When the main roof panel of a building structure is raised by crane, the kneewalls fall into position by gravity.

No workers are needed under the roof panel when the load is supported by the crane, and accidents to workers under the supported roof structure are avoided. Work on site is thus reduced and the roof can be closed more quickly to the weatherproof stage. No additional panels need be installed, transported or lifted on top of the modules. The only work to be done is fastening certain parts to the structure, and ridge vent installation.

Prefabricating the roof assembly allows stronger lumber to be used for the bottom chord of the truss, and the top chord members can be reduced to smaller nominal dimensions of lumber.

The trusses use double metal hinges of the invention, which can be installed by the truss manufacturer at any desired position. For example, porch rafters may be hinged onto sides of the roof truss and folded for transportation using the double hinge joint described. In a non-limiting example, a truss having a 5/12 roof pitch can have a 3/12 pitch porch roof hinged to it, as shown in the figures.

It is a further advantage that sufficient clearance may be left for electric wiring and vent pipe connections above the bottom chord of a roof truss. This clearance may be about 2 to 5½ inches.

With reference to the FIGS., in which like numerals represent like parts, FIG. 1 shows an example of a roof truss 2 of the invention, used in construction of a peaked roof. Truss 2 includes bottom chord 4, top chord 6, cone 8 and kneewall 10 hinged together. Double hinge 12 allows cone 8 to be folded back on top of chord 6. FIG. 3 shows a detail of the joint around hinge 12, in which top chord 6 has attached sheet sheathing 14 and cone 8 has attached sheet sheathing 16. Double hinge 12 includes pivots 18 and 20 separated by plate 22. Plate 22 allows accommodation of sheet sheathing 14 and 16 when the hinged truss is folded, as shown in FIG. 5. The sheet sheathing may be plywood or other sheet material known in the art. Roofing materials may also be prefabricated on the sheet sheathing if central plate 22 is sized appropriately to accommodate this thickness between the structural members.

With reference to FIG. 5, single hinge 24 allows kneewall 10 to be folded against the underside of top chord 6. When the folded structure of FIG. 5 is raised by a crane, kneewall 10 drops into place, supported by member 26, as shown in FIG. 4.

With reference now to FIGS. 1 and 2, FIG. 2 shows a detail of the hinged roof truss, with hinging of a porch addition to the main truss. Double hinge 12 joins top chord 6 and porch rafter 30. Sheet sheathing 16 attached to top chord 6 and sheet sheathing 32 attached to porch rafter 30 are accommodated between arms 34 and 36 of hinge 12 when the truss is folded with top chord 6 and porch rafter 30 parallel to each other and separated by sheathing 16 and 32, as shown in FIG. 5.

Single hinge 24, shown in FIGS. 1 and 2, allows top chord 6 to be folded against bottom chord 4. Member 38, which supports the porch structure, is pivoted at 40 against porch rafter 30 when the truss is folded, and extends to rest against structural member 42 when truss 2 is opened and assembled.

FIGS. 6 to 8 show a double hinge of the invention, in detail. Hinge 12, shown in FIG. 6 includes a central plate 22 having plates 34 and 36 pivoted to it at pivots 18 and 20, respectively. Plates 34 and 36 rotate about pivots 18 and 20. Pivots 18 and 20 are preferably formed by cutting holes in plates 12, 34, and 36. Plate 34 is aligned with and overlaps one end of plate 22 and plate 36 is aligned with and overlaps the opposite end of plate 12. Edges of the holes in plate 12 are crimped to hold plates 34 and 36 through the holes therein, forming pivots 18 and 20, as seen in FIG. 8.

FIG. 7 shows a detail of teeth 44 which are struck from end portions of plates 34 and 36 opposite from the ends which pivot about ends of plate 22. The teeth leave slots in the metal sheet material of the plates where the teeth are bent perpendicularly to the plate surface. Teeth 44 are struck from plates 34 and 36 in rows, and adjacent rows are oriented in opposite directions to facilitate firm placement of the teeth in a structural member of the truss. For example, teeth in row 46 are oriented oppositely from teeth in row 48.

In use, hinge 12 is positioned so that teeth 44 of plate 34 are driven into a side of a structural member and teeth 44 of plate 36 are driven into a side of another structural member, thus connecting the two structural members by the hinged joint. Each of these structural members may have sheet sheathing attached to an outer face, and the thickness of both layers of sheet sheathing is accommodated by hinge member 52 which extends between the two hinge pivots. Distance A, shown in FIGS. 6 and 8, is at least twice the thickness of a sheet of plywood sheet sheathing or other sheathing commonly attached to structural members in roof construction.

A double hinged joint of the invention may be made from sheet metal, such as galvanized steel, or from other material known in the art.

While the invention has been described above with respect to certain embodiments thereof, variations and modifications may be made without departing from the spirit and scope of the invention.

What is claimed is:

1. A double hinged joint for joining frame members of a hinged truss, each member having a sheet of sheathing attached thereto, used in building construction, comprising:

an elongated flat plate comprising first and second pivots substantially adjacent first and second ends of said elongated plate, respectively;

first and second flat plate members pivoted at said first and second pivots, respectively;

wherein a first end of said first plate member overlaps and is pivoted at said first end of said elongated plate, and a first end of said second plate overlaps and is pivoted at said second end of said elongated plate, and said first and second plate members rotate about said pivots in the plane of said elongated plate; and wherein the distance between said first ends of said first and second plate members is equal to at least the thickness of two sheets of the sheet sheathing;

whereby said first plate member is attached to a first structural member having sheet sheathing attached thereto and said second plate member is attached to a second structural member having sheet sheathing attached thereto and said sheet sheathing is accommodated by the length of the elongated flat plate when said first and second structural members are folded substantially parallel to each other.

2. A double hinged joint according to claim 1 wherein said first and second plate members each comprises means for gripping structural members of the truss.

3. A double hinged joint according to claim 2 wherein said gripping means comprises a plurality of teeth extending substantially perpendicularly to said first and second plate members, said teeth being struck from said first and second plate members leaving a plurality of slots in said plate members.

4. A double hinged joint according to claim 3 wherein said teeth substantially cover second end areas of said first and second plate members not overlapping said elongated plate.

5. A hinged building truss comprising first and second elongated wooden structural members each having a sheet of sheathing attached thereto, said structural members being connected by a double hinged joint, said joint comprising:

an elongated flat plate comprising first and second pivots substantially adjacent first and second ends of said elongated plate, respectively;

first and second flat plate members pivoted at said first and second pivots, respectively;

wherein a first end of said first plate member overlaps and is pivoted at said first end of said elongated plate, and a first end of said second plate member overlaps and is pivoted at said second end of said elongated plate, and said first and second plate members rotate about said pivots, in the plate of said elongated flat plate;

wherein said first and second plate members each comprises means for gripping said first and second structural members of the truss, respectively, whereby said structural members rotate about said pivots, and the length of said elongated plate between said overlapping portions of said first and second plate members is at least the thickness of two sheets of the sheet sheathing attached to said structural members when the double hinged joint is in folded position with the structural members substantially parallel and adjacent to each other.

6. A hinged building truss according to claim 5 wherein the means for gripping comprises a plurality of teeth struck from said first an second plate members.

7. A hinged roof truss comprising structural members having attached sheet sheathing, said structural members being assembled together;

wherein two said structural members are hinged together by a double hinge joint comprising two end plates pivoted at each end of a central elongate plate, each end plate of said double hinge joint gripping one of said structural members having attached sheet sheathing, whereby said structural members are folded so that said members having said end plates attached are in substantially parallel configuration and said sheet sheathing is accommodated in the space therebetween formed by the central elongated plate wherein the width of said space is at least the thickness of two sheets of the sheet sheathing.

8. A hinged roof truss according to claim 7 wherein the structural members comprise a top chord of the roof and a porch rafter.

9. A hinged roof truss according to claim 7 wherein the structural members comprise a top chord and a cone.

10. A hinged roof truss according to claim 9 further comprising a kneewall hinged to said top chord.

* * * * *